(12) United States Patent
Wu et al.

(10) Patent No.: US 9,965,646 B2
(45) Date of Patent: May 8, 2018

(54) SENSITIVE DATA DISCRIMINATION METHOD AND DATA LOSS PREVENTION SYSTEM USING THE SENSITIVE DATA DISCRIMINATION METHOD

(71) Applicant: INSTITUTE FOR INFORMATION INDUSTRY, Taipei (TW)

(72) Inventors: Jain-Shing Wu, Taipei (TW); Song-Kong Chong, Pingtung County (TW); Chien-Ting Kuo, Taichung (TW)

(73) Assignee: Institute For Information Industry, Taipei (TW)

( * ) Notice: Subject to any disclaimer, the term of this patent is extended or adjusted under 35 U.S.C. 154(b) by 506 days.

(21) Appl. No.: 14/530,933

(22) Filed: Nov. 3, 2014

(65) Prior Publication Data

US 2015/0154420 A1      Jun. 4, 2015

Related U.S. Application Data

(60) Provisional application No. 61/910,288, filed on Nov. 29, 2013.

(51) Int. Cl.
*H04N 7/16* (2011.01)
*G06F 21/62* (2013.01)
*G06F 21/16* (2013.01)

(52) U.S. Cl.
CPC .......... *G06F 21/6245* (2013.01); *G06F 21/16* (2013.01); *G06F 2221/2101* (2013.01)

(58) Field of Classification Search
CPC ................. G06F 21/6245; G06F 21/16; G06F 2221/2101

USPC ................. 726/25, 26, 27; 380/44, 277, 286
See application file for complete search history.

(56) References Cited

U.S. PATENT DOCUMENTS

| | | | |
|---|---|---|---|
| 6,901,145 B1 * | 5/2005 | Bohannon | G06F 21/31 380/277 |
| 7,536,642 B2 | 5/2009 | Wilbrink et al. | |
| 8,141,149 B1 | 3/2012 | Henry et al. | |
| 9,166,993 B1 * | 10/2015 | Liu | H04L 63/1425 |
| 9,213,836 B2 * | 12/2015 | Mayer | G06F 21/56 |
| 9,225,772 B2 * | 12/2015 | Lui | H04L 67/10 |
| 9,275,065 B1 * | 3/2016 | Ganesh | G06F 17/30082 |
| 9,571,516 B1 * | 2/2017 | Curcio | H04L 63/1433 |
| 2006/0236236 A1 | 10/2006 | Wilbrink et al. | |
| 2007/0060114 A1 * | 3/2007 | Ramer | G06F 17/30867 455/418 |
| 2008/0168135 A1 * | 7/2008 | Redlich | G06Q 10/10 709/204 |

(Continued)

FOREIGN PATENT DOCUMENTS

CN      103207826 A      7/2013

*Primary Examiner* — Thu Ha Nguyen

(57) ABSTRACT

An exemplary embodiment of the present disclosure illustrates a sensitive data discrimination method executed in a data loss prevention system to determine whether a file has the least one sensitive data during a file generation proceeding. Steps of the sensitive data discrimination method are illustrated as follows. Multiple characters inputted via a keyboard are recorded. The recorded characters are trimmed to generate a trimmed data. The trimmed data and at least one predefined term related to the at least one sensitive data are compared, to determine whether the trimmed data has the at least one sensitive data.

10 Claims, 4 Drawing Sheets

(56) References Cited

U.S. PATENT DOCUMENTS

| | | | |
|---|---|---|---|
| 2011/0225650 A1* | 9/2011 | Margolies | G06F 21/554 726/22 |
| 2011/0265156 A1* | 10/2011 | Bombay | G06F 21/34 726/5 |
| 2012/0089562 A1* | 4/2012 | Deremigio | G06F 17/30563 707/602 |
| 2012/0117644 A1* | 5/2012 | Soeder | G06F 21/554 726/22 |
| 2013/0024788 A1* | 1/2013 | Olsen | G06Q 10/10 715/753 |
| 2015/0154420 A1* | 6/2015 | Wu | G06F 21/16 726/27 |
| 2016/0073286 A1* | 3/2016 | Wang | H04W 28/0236 370/332 |
| 2017/0001308 A1* | 1/2017 | Bataller | B25J 9/163 |
| 2017/0003876 A1* | 1/2017 | Marsden | H03K 17/9622 |

* cited by examiner

SENSITIVE DATA DISCRIMINATION METHOD AND DATA LOSS PREVENTION SYSTEM USING THE SENSITIVE DATA DISCRIMINATION METHOD

BACKGROUND

1. Technical Field

The present invention relates to a data loss prevention (DLP) system; in particular, to a format free sensitive data discrimination method and a data loss prevention system using the sensitive data discrimination method.

2. Description of Related Art

The sensitive data is the private or confidential data of the government, enterprise or hospital, and have the literal contents which cannot be betrayed, such as personal information, businesses secrets, state secrets, or anamnesis. The sensitive data is generally recorded in a file of a computing device, and thus someone now uses the data loss prevention system to prevent the betrayal of the file having the sensitive data.

The traditional data loss prevention system must parse the file to recognize the format of the file, so as to extract literal contents of the file, and then traditional data loss prevention system further analyzes whether file has the sensitive data. Unfortunately, it consumes time and manpower much to develop a file format parser. A total number of file formats may be larger than one hundred, and even some file format may be undisclosed, such that the traditional data loss prevention system cannot parse all of the files with different formats.

Though some traditional data loss prevention system can analyze file to recognize the undisclosed file format by using a reverse engineering, the analysis manner is still complicated, and the loading for analyzing the file is still heavy. However, the traditional data loss prevention system still cannot detect and prevent the betrayal of the sensitive data through other new file format in real time.

SUMMARY

An exemplary embodiment of the present disclosure provides a sensitive data discrimination method executed in a data loss prevention system to determine whether a file has the least one sensitive data during a file generation proceeding. Steps of the sensitive data discrimination method are illustrated as follows. Multiple characters inputted via a keyboard are recorded. The recorded characters are trimmed to generate a trimmed data. The trimmed data and at least one predefined term related to the at least one sensitive data are compared, so as to determine whether the trimmed data has the at least one sensitive data.

An exemplary embodiment of the present disclosure provides a data loss prevention system for determining whether a file has at least one sensitive data during a file generation proceeding. The data loss prevention system comprises a log driving module, a pre-filtering module, and a sensitive data analyzing module. The log driving module is used to record multiple characters inputted via a keyboard. The pre-filtering module is used to the recorded characters are trimmed to generate a trimmed data. The sensitive data analyzing module is used to compare the trimmed data with at least one predefined term related to the at least one sensitive data, so as to determine whether the trimmed data has the at least one sensitive data.

To sum up, without parsing the file to recognize the file format, the sensitive data discrimination method and the data loss prevention system provided by exemplary embodiments of the present disclosure can extract the literal contents of the file to determine whether a file has at least one sensitive data during a file generation proceeding.

In order to further the understanding regarding the present disclosure, the following embodiments are provided along with illustrations to facilitate the present disclosure.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

It will be understood that, although the terms first, second, third, and the like, may be used herein to describe various elements, components, regions, layers and/or sections, these elements, components, regions, layers and/or sections should not be limited by these terms. These terms are only to distinguish one element, component, region, layer or section from another region, layer or section discussed below could be termed a second element, component, region, layer or section without departing from the teachings of the present disclosure. As used herein, the term "and/or" includes any and all combinations of one or more of the associated listed items.

An exemplary embodiment of the present disclosure provides a sensitive data discrimination method and a data loss prevention system executing the sensitive data discrimination method for determining whether a file has the least one sensitive data during a file generation proceeding. Since the sensitive data discrimination method can determine whether the file has the least one sensitive data during the file generation proceeding, the sensitive data discrimination method does not need to parse the file to recognize the file format, and can detect and prevent the betrayal of the sensitive data through other new file format in real time.

Figure 1:
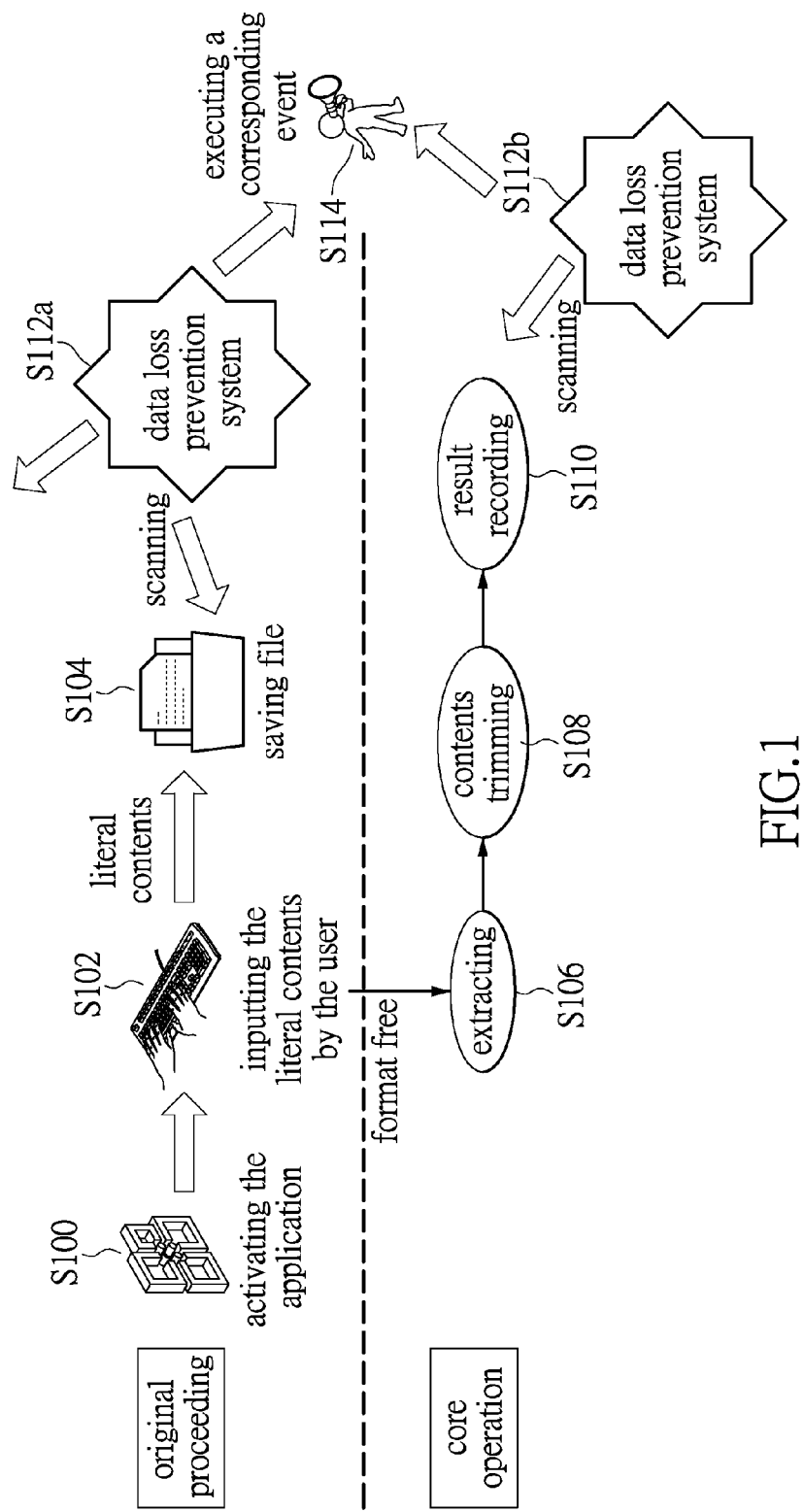
FIG. 1 is a schematic diagram showing concepts of a sensitive data discrimination method according to an exemplary embodiment of the present disclosure.

Referring to FIG. 1, FIG. 1 is a schematic diagram showing concepts of a sensitive data discrimination method according to an exemplary embodiment of the present disclosure. Generally, when the user wants to edit a file, the user may open a corresponding application at step S100, such as Microsoft Office or other document edition software. Then, at step S102, the user may input multiple characters via a keyboard, such as a physic keyboard, a virtual keyboard on a touch screen, or other input device which projects or displays a keyboard image on a screen for the input operation of the user, to generate literal contents in the file currently edited. Next, at step S104, the user saves the file to record the characters inputted by the user in the file. Next, at step S112a, the data loss prevention system scans the file saved by the user, and parses the file to analyze the recorded literal contents of the file which the user inputs, so as to determine whether the literal contents inputted by the user have the sensitive data. At steps S114, if the data loss prevention system determines the literal contents inputted by the user have the sensitive data, the data loss prevention system executes an event corresponding to the sensitive data, such as sending a warning message to an administrator.

The steps S100, S102, S104, S11a, and S114 belong to the original proceeding of the current related art, to make the sensitive data discrimination method be format free, the main concepts of the sensitive data discrimination method are to execute format free steps S106 through S110 and S112b after the application is activated.

At step S106, when the application is activated, the log driving module is driven to record the characters inputted by the user through the keyboard in real time. That is, the characters are buffered in a memory block of the buffer module or stored in the storage module. Next, at step S108, a pre-filtering module is used to trim the recorded characters to generate the trimmed data. To put it concretely, since the user may input some specific characters, such as enter, tab, or backspace, the pre-filtering module should trim the recorded characters to obtain the real literal contents inputted by the user.

For example, the user may type erroneously, and the specific character of "[backspace]" is inputted by the user to cancel the previous error character; or alternatively, the user may input the specific character of "[enter]" to type in the next line; or alternatively, the user may input the specific character of "[tab]" to type in the next column. It is known that, the pre-filtering module must trim the recorded characters according to definition of the specific characters, so as to filter the noise of the recorded characters to obtain the real literal contents inputted by the user, i.e. the trimmed data.

Next, at step S110, the trimmed data is transmitted to the data loss prevention system. Then at step S112b, the data loss prevention system scans the trimmed data, and analyzes whether the trimmed data has the sensitive data. Specifically, the data loss prevention system may define several terms related to the sensitive data, and the data loss prevention system compares the trimmed data with the terms, so as to determine whether the trimmed data has the sensitive data. If that the trimmed data has the sensitive data is determined at step S112, the data loss prevention system can execute the event at step S114.

Figure 2:
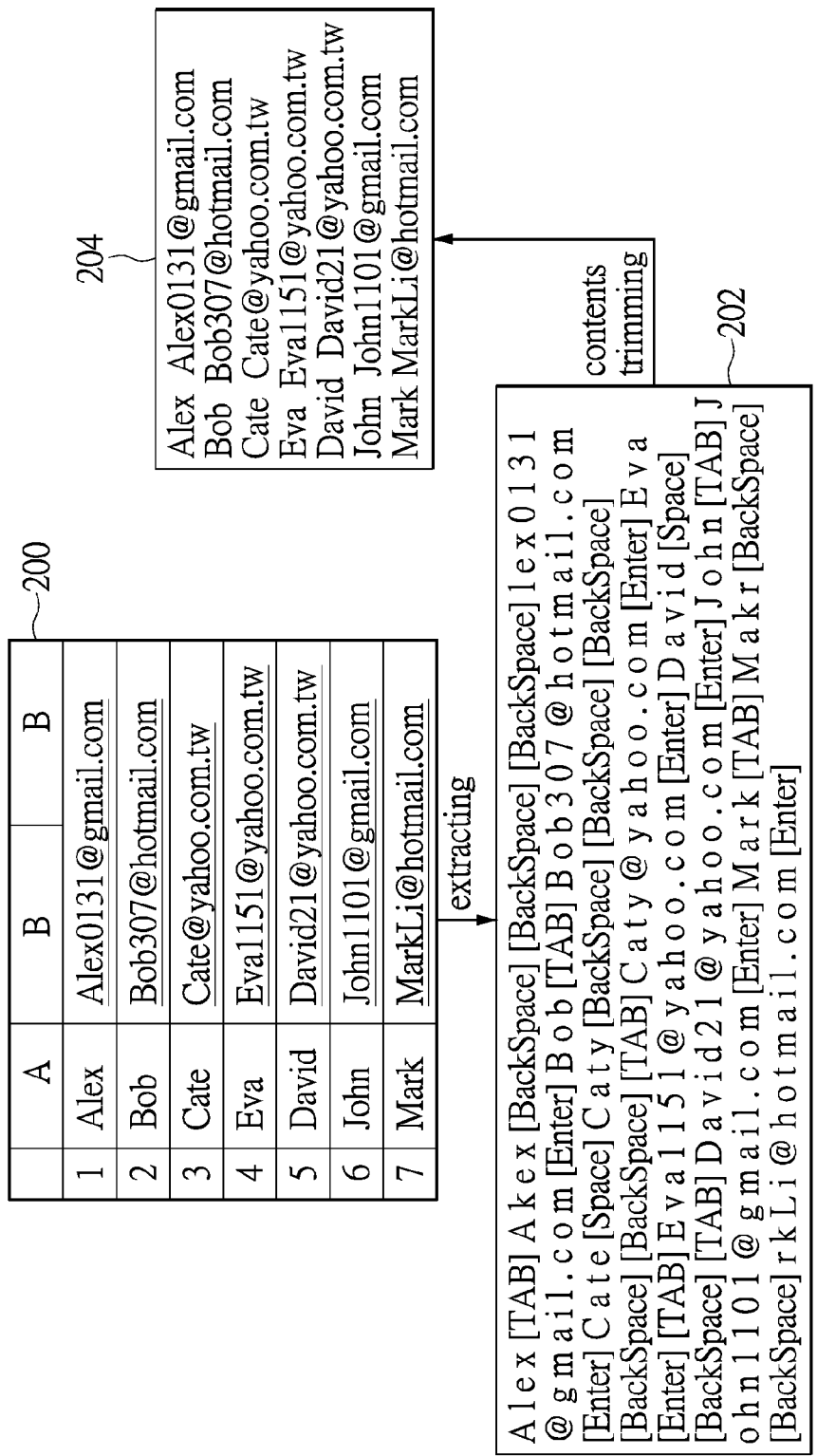
FIG. 2 is a schematic diagram showing literal contents displayed by an application, recorded characters, and trimmed data according to an exemplary embodiment of the present disclosure.

Next, an example is given to illustrate how to trim the recorded characters o generate the trimmed data at step S108. Referring to FIG. 2, FIG. 2 is a schematic diagram showing literal contents displayed by an application, recorded characters, and trimmed data according to an exemplary embodiment of the present disclosure. In FIG. 2, the user inputs literal contents 200 displayed by the application of a sheet edition software, and the log driving module records the characters 202 input by the user through the keyboard. The pre-filtering module trims the recorded characters 202 to filter the noise of the recorded characters 202, and then generates the trimmed data 204, wherein the contents of the trimmed data 204 essentially similar or equal to the literal contents displayed by the application.

For example, the user may want to type four characters of "Alex" and then inputs a specific character of "tab" to type other characters in the next column. However, the user mistakenly inputs the four characters of "Akex", and thus the user inputs three specific characters of "[backspace]" and then inputs the three characters of "lex". Thus, the specific character of "[tab]" in the first row of the recorded characters 202 is seen as a space by the pre-filtering module, and the characters of "kex[backspace][backspace][backspace]" are seen as the noise and deleted by the pre-filtering module.

Figure 3:
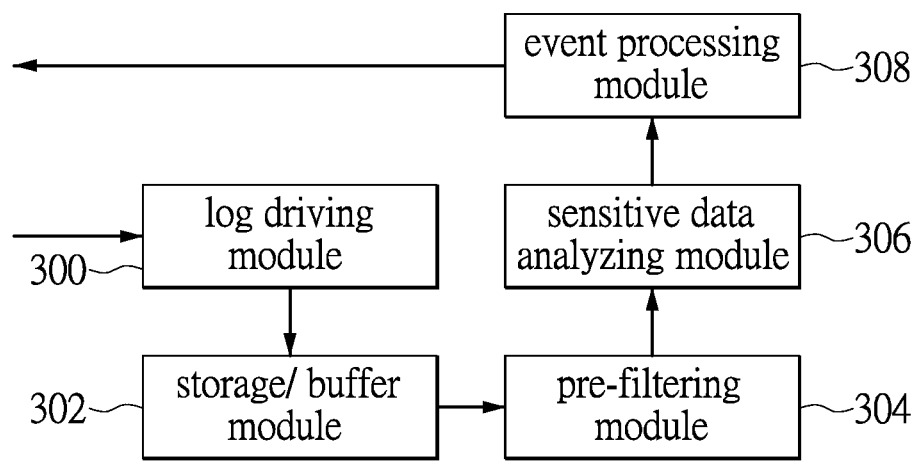
FIG. 3 is an architecture diagram of a data loss prevention system according to an exemplary embodiment of the present disclosure.

Next, referring to FIG. 3, FIG. 3 is an architecture diagram of a data loss prevention system according to an exemplary embodiment of the present disclosure. The data loss prevention system 3 is implemented by a software, hardware, or firmware, and the present disclosure does not limit the implementation of the data loss prevention system 3. The data loss prevention system 3 comprises a log driving module 300, a storage/buffer module 302, a pre-filtering module 304, a sensitive data analyzing module 306, and an event processing module 308. The log driving module 300 is electrically connected to the storage/buffer module 302, the storage/buffer module 302 is electrically connected to the pre-filtering module 304, the pre-filtering module 304 is electrically connected to the sensitive data analyzing module 306, and the sensitive data analyzing module 306 is electrically connected to the event processing module 308.

The log driving module 300 is driven by a specific event, such as activating a specific application of document edition software. When the log driving module 300 is driven by the specific event, the log driving module 300 records the characters inputted via the keyboard. Next, the log driving module 300 stores or buffers the recorded characters in the storage/buffer module 302. The storage/buffer module 302 can be a storage module, and the recorded characters are saved in a file; or alternatively, the storage/buffer module 302 is a buffer module, and the recorded characters are buffered in the memory block of the buffer module. In addition, the storage/buffer module 302 can one component of the data loss prevention system 3, or independent to the data loss prevention system 3, such as an external storage/buffer module connected to the data loss prevention system 3.

The pre-filtering module 304 trims the recorded characters in the memory block of or the file according to the definition of the specific characters, so as to generate the trimmed data, wherein the contents of the trimmed data 204 essentially similar or equal to the literal contents inputted by the user. Next, the pre-filtering module 304 sends the trimmed data to the sensitive data analyzing module 306. The sensitive data analyzing module 306 defines several terms related to the sensitive data, and the sensitive data analyzing module 306 compares the trimmed data with the terms, so as to determine whether the trimmed data has the sensitive data. It is noted that string match, regular expression match, or a term hash may be used to compare the trimmed data with the at least one predefined term related to the at least one sensitive data, and the present disclosure does not limit the comparison manner.

When sensitive data analyzing module 306 finds the trimmed data has the sensitive data, the event processing module 308 executes the event corresponding to the type of the sensitive data. For example, the event may comprise at least one of sending a warning message to a system administrator or the user, generating a report to the system administrator, generating a log of security information and event management, locking the file, copying the file to a secure database, generating a fingerprint of the file, embedding a watermark into the file, and attaching a tag in the file. In short, the type of the event is not used to limit the present disclosure.

Figure 4:
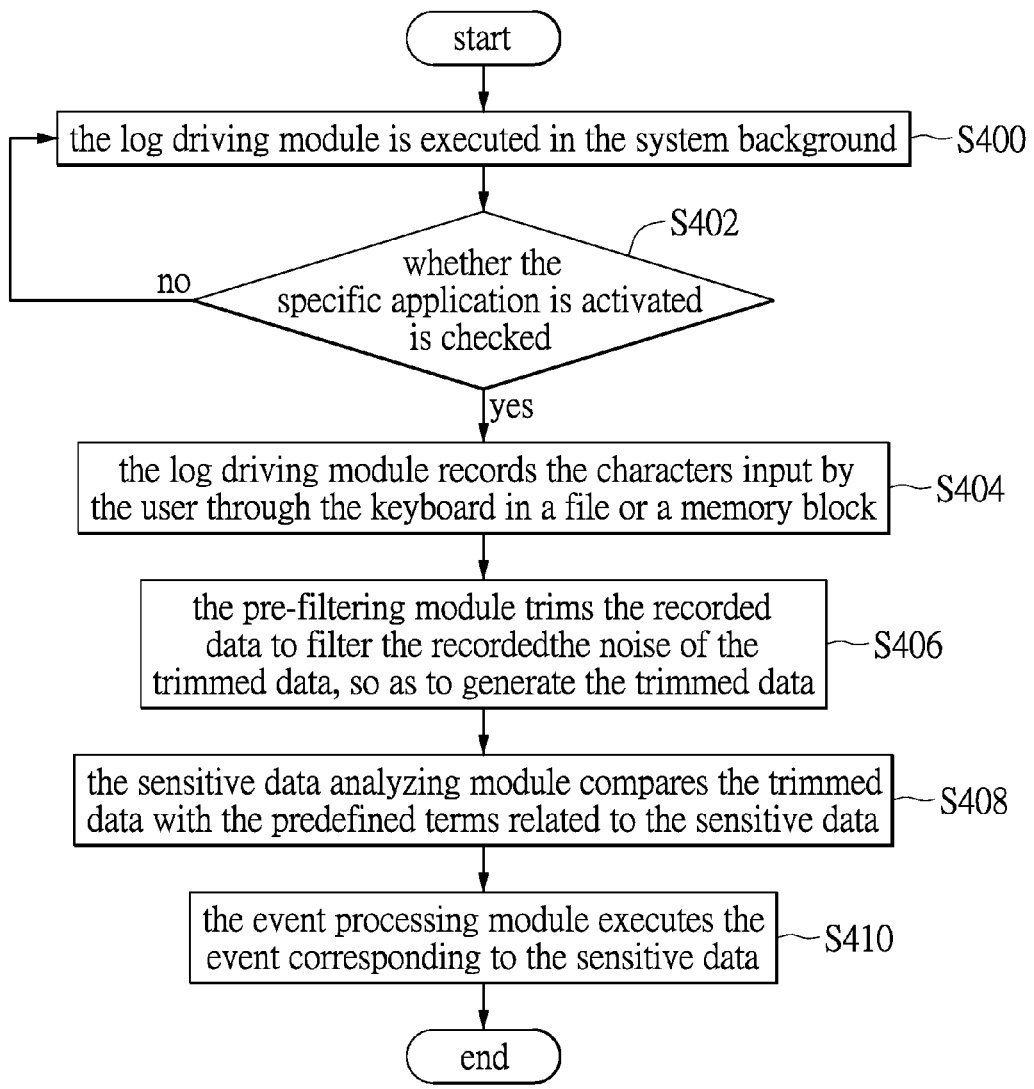
FIG. 4 is a flow chart of a sensitive data discrimination method according to an exemplary embodiment of the present disclosure.

Referring to FIG. 4, FIG. 4 is a flow chart of a sensitive data discrimination method according to an exemplary embodiment of the present disclosure. The sensitive data discrimination method can be executed in the data loss prevention system or other computing device. At step S400, the log driving module is executed in the system background, i.e. waiting some specific event to drive the log driving module. At step S402, whether the specific application is activated is checked, for example, whether a document edition software is activated is checked. If some specific application is activated, the sensitive data discrimination method drives the log driving module to executed step S404; otherwise, the sensitive data discrimination method still executes step S400.

Next, at step S404, the log driving module records the characters inputted via the keyboard in a file or a memory block. The log driving module may records the characters inputted via the keyboard in a file or a memory block periodically, non-periodically, or at the time which some specific condition occurs (such as the user has not input any characters for a specific time). In short, the present disclosure does not limit the storing time or the driving manner. Then, at step S406, according to the definition of the specific characters, the pre-filtering module trims the recorded data to filter the recorded the noise of the trimmed data, so as to generate the trimmed data. Next, the sensitive data analyzing module compares the trimmed data with the predefined terms related to the sensitive data. Then, at step S410, the event processing module executes the event corresponding to the sensitive data according to the comparison result generated in step S408.

Accordingly, the sensitive data discrimination method and the data loss prevention system according to an exemplary embodiment of the present disclosure can extract and discriminate the literal contents inputted via the keyboard before the file is saved and created. Thus, without parsing the file to recognize the file format, the sensitive data discrimination method and the data loss prevention system can analyze whether the inputted literal contents have the sensitive data. That is, the sensitive data discrimination method and the data loss prevention system can detect and prevent the betrayal of the sensitive data through other new file format in real time, thus avoiding the data betrayal loss in real time. In addition, since the sensitive data discrimination method and the data loss prevention system does not need to parse the file to recognize the file format, the consuming time and cost for developing the file format parser is omitted.

The descriptions illustrated supra set forth simply the preferred embodiments of the present disclosure; however, the characteristics of the present disclosure are by no means restricted thereto. All changes, alternations, or modifications conveniently considered by those skilled in the art are deemed to be encompassed within the scope of the present disclosure delineated by the following claims.

What is claimed is:

1. A sensitive data discrimination method, executed in a data loss prevention system, for determining whether there is at least one sensitive data in contents inputted to generate a file during a file generation proceeding, comprising:
    recording multiple characters inputted via a keyboard in real time;
    storing the recorded characters in a file or buffering the recorded characters in a memory block;
    trimming the recorded characters according to definitions of the characters to filter noises in the recorded characters and generate a trimmed data only including literal contents inputted via the keyboard;
    obtaining the recorded characters from the file or the memory block before the recorded characters are trimmed;
    comparing the trimmed data with at least one predefined term related to the at least one sensitive data, so as to determine whether the trimmed data has the at least one sensitive data; and
    executing an event corresponding to the at least one sensitive data according to a comparison result.

2. The sensitive data discrimination method according to claim 1, wherein after a specific application is activated, the characters inputted via the keyboard are recorded.

3. The sensitive data discrimination method according to claim 1, wherein according to definition of at least one specific character, the recorded characters are trimmed, so as to filter noise of the recorded characters, and then the trimmed data is generated accordingly.

4. The sensitive data discrimination method according to claim 1, wherein the event comprises at least one of sending a warning message to a system administrator or a user, generating a report to the system administrator, generating a log of security information and event management, locking the file, copying the file to a secure database, generating a fingerprint of the file, embedding a watermark into the file, and attaching a tag in the file.

5. The sensitive data discrimination method according to claim 1, wherein a string match, regular expression match, or a term hash is used to compare the trimmed data with the at least one predefined term related to the at least one sensitive data.

6. A data loss prevention system for determining whether there is at least one sensitive data in contents inputted to generate a file during a file generation proceeding, comprising:
    a log driving module, used to record multiple characters inputted via a keyboard in real time;
    a storage/buffer module, used to store the recorded characters in a file or buffering the recorded characters in a memory block;
    a pre-filtering module, used to trim the recorded characters according to definitions of the characters to filter noises in the recorded characters and generate a trimmed data only including literal contents inputted via the keyboard;
    the pre-filtering module obtains the recorded characters from the file or the memory block before the recorded characters are trimmed;
    a sensitive data analyzing module, used to compare the trimmed data with at least one predefined term related to the at least one sensitive data, so as to determine whether the trimmed data has the at least one sensitive data; and
    an event processing module, used to execute an event corresponding to the sensitive data according to a comparison result.

7. The data loss prevention system according to claim 6, wherein after a specific application is activated, the log driving module is driven to record the characters inputted via the keyboard.

8. The data loss prevention system according to claim 6, wherein according to definition of at least one specific characters, the pre-filtering module trims the recorded characters to filter noise of the recorded characters, and then generates the trimmed data accordingly.

9. The data loss prevention system according to claim 6, wherein the event comprises at least one of sending a warning message to a system administrator or a user, generating a report to the system administrator, generating a log of security information and event management, locking the file, copying the file to a secure database, generating a fingerprint of the file, embedding a watermark into the file, and attaching a tag in the file.

10. The data loss prevention system according to claim 6, the sensitive data analyzing module uses a string match, regular expression match, or a term hash to compare the trimmed data with the at least one predefined term related to the at least one sensitive data.

* * * * *